United States Patent [19]

Kaul

[11] 4,042,577
[45] Aug. 16, 1977

[54] AZO DYES HAVING ONE OR TWO TRIAZINYL-OR PYRIMIDYL-ACETIC ACID ESTER OR AMIDE COUPLING COMPONENT RADICALS

[75] Inventor: Bansi Lal Kaul, Basel, Switzerland

[73] Assignee: Sandoz Ltd., Basel, Switzerland

[21] Appl. No.: 510,476

[22] Filed: Sept. 30, 1974

[30] Foreign Application Priority Data

Oct. 5, 1973 Switzerland .................. 14255/73

[51] Int. Cl.² .............. C09B 29/36; C09B 35/18; D06P 1/04
[52] U.S. Cl. ............................ 260/153; 260/146 D; 260/146 T; 260/154; 260/256.4 R; 260/256.4 C; 260/261; 260/250 P; 260/250 Q; 260/250 R; 260/251 Q; 106/23; 106/288 Q; 106/308 Q; 544/219; 544/204; 544/208; 544/210; 544/211; 544/213
[58] Field of Search .............. 260/146 D, 146 T, 153, 260/154

[56] References Cited

U.S. PATENT DOCUMENTS

| 3,567,706 | 3/1971 | Brenneisen et al. | 260/153 |
| 3,711,461 | 1/1973 | Pretzer et al. | 260/154 |

FOREIGN PATENT DOCUMENTS

| 47-31926 | 8/1972 | Japan | 260/154 |

Primary Examiner—Floyd D. Higel
Attorney, Agent, or Firm—Gerald D. Sharkin; Richard E. Vila; Melvyn M. Kassenoff

[57] ABSTRACT

Compounds of the formula

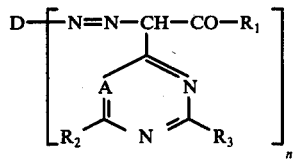

in which
$R_1$ signifies a group of the formula $-NH_2$, $-NH-R_4$ or $-O-R_4$, in which $R_4$ signifies a $(C_{1-8})$alkyl radical, a $(C_{5-8})$cycloalkyl radical or an unsubstituted or substituted phenyl, naphthyl or heterocyclic radical,
each of $R_2$ and $R_3$, which may be the same or different, signifies a hydrogen atom, a hydroxyl, $(C_{1-8})$alkoxy, amino, $(C_{5-8})$cycloalkylamino, $(C_{1-8})$alkylamino, $(C_{1-8})$dialkylamino, phenyl- or naphthylamino or N-phenyl-N-$(C_{1-8})$alkylamino group,
A signifies a nitrogen atom or a group of the formula

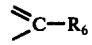

in which $R_6$ signifies a hydrogen or halogen atom or a $(C_{1-8})$alkyl radical,
either $n$ is 1 and D signifies the radical of a diazo component,
or $n$ is 2 and D signifies the radical of a tetrazo component,
are useful as coloring materials, especially as pigments for plastics, synthetic resins, varnishes, viscose, cellulose acetate, printing inks and paper stock. The dyeings exhibit good fastness to heat, light, weather and solvents and resistance to migration, crystallization and chemicals such as sulfur dioxide and alkalis. The compounds wherein $R_2$ and $R_3$ are other than hydroxy are also useful as disperse dyes for high molecular weight hydrophobic substrates such as polyesters, cellulose acetates and synthetic polyamides. These dyeings exhibit good fastness to light, sublimation, washing, solvents, rubbing, gas fumes, reduction and chlorine.

29 Claims, No Drawings

AZO DYES HAVING ONE OR TWO TRIAZINYL-OR PYRIMIDYL-ACETIC ACID ESTER OR AMIDE COUPLING COMPONENT RADICALS

The present invention relates to azo compounds, their production and use.

Accordingly, the present invention provides compounds of formula I,

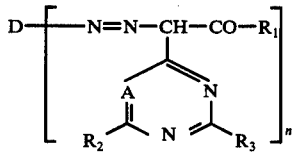

in which
- $R_1$ signifies a group of the formula $-NH_2$, $-NH-R_4$ or $-O-R_4$, in which
  - $R_4$ signifies a $(C_{1-8})$alkyl radical, $(C_{5-8})$cycloalkyl radical, unsubstituted phenyl, naphthyl or heterocyclic radical of aromatic character, or a phenyl, naphthyl or heterocyclic radical of aromatic character substituted by up to 3 substituents selected from up to 2 substituents selected from chlorine, bromine, $(C_{1-8})$alkyl and $(C_{1-8})$alkoxy and up to one substituent selected from trifluoromethyl, sulphoguanidine, nitro, cyano, a group of the formula $-CO-NH-R_5$ and a group of the formula $-SO_2-NH-R_5-$, in which $R_5$ signifies a $(C_{1-8})$alkyl, $(C_{5-8})$cycloalkyl, an unsubstituted phenyl or naphthyl radical or a phenyl or naphthyl radical substituted by up to three substituents selected from up to 2 substituents selected from halogen, $(C_{1-8})$alkyl and $(C_{1-8})$alkoxy radicals, and up to one substituent selected from trifluoromethyl, nitro, cyano, phenylaminocarbonyl or -sulphonyl,
- each of $R_2$ and $R_3$, which may be the same or different, signifies a hydrogen atom, a hydroxyl, $(C_{1-8})$alkoxy, amino, $(C_{5-8})$cycloalkylamino, $(C_{1-8})$alkylamino, $(C_{1-8})$dialkylamino, phenyl- or naphthylamino or N-phenyl-N-$(C_{1-8})$alkylamino group, preferably both are hydroxy,
- A signifies a nitrogen atom or a group of the formula

in which $R_6$ signifies a hydrogen or halogen atom or a $(C_{1-8})$alkyl radical, either $n$ signifies 1 and D signifies the radical of the diazo component, or $n$ signifies 2 and D signifies the radical of a tetrazo component, and the molecule is free from sulphonic acid groups.

The present invention also provides a process for the production of compounds of formula I, as defined above, comprising coupling a diazotized or tetrazotized amine of formula II,

in which D and $n$ are as defined above, with a compound of formula III,

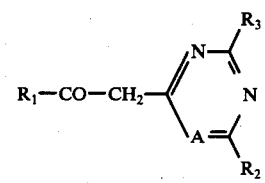

in which $R_1$, $R_2$, $R_3$ and A are as defined above, preferably in a 1:1 (where $n$ is 1) or 1:2 (where $n$ is 2) molar ratio.

The coupling reaction is carried out according to known methods. Suitably, the compound of formula III is dissolved in an organic solvent, for example, dimethylformamide, or is suspended in water, and is reacted therein.

In the compounds of formula I, where $R_1$ signifies a radical of the formula $-NH-R_4$ or $-O-R_4$ and where $R_4$ signifies an unsubstituted or substituted heterocyclic radical of aromatic character, the heterocyclic radical is suitably a five- or six-membered ring containing one or two hetero atoms, which may be the same or different, selected from nitrogen and sulphur; in addition the heterocyclic ring may be fused with a carbocyclic ring, for example a benzene ring. Examples of suitable heterocyclic radicals for $R_4$ include phthalimidyl, phthalazinyl, quinazolonyl, quinoxalinyl, quinoxaline-2,3-dion-yl radical, benzimidazolonyl, 2-, 3-, or 4-pyridyl, 2- or 3-thienyl or 2-thiazolyl. Among these, the benzimidazolonyl radical is preferred.

The diazo or tetrazo component radicals as D in the compounds of formula I may be any of the radicals which would be used in the chemistry of azo pigments, for example, radicals of the phenyl, naphthyl, quinolyl, benzimidazolyl, quinoxalyl or anthraquinonyl series in which the aromatic nuclei are unsubstituted or substituted by a total or up to 3 substituents selected from up to 3 substituents selected from fluorine, chlorine and bromine atoms, $(C_{1-8})$alkyl and $(C_{1-8})$alkoxy groups, up to 2 substituents selected from cyano, nitro, $(C_{1-8})$alkoxycarbonyl and $(C_{1-8})$alkylsulphonyl groups and one substituent selected from trifluoromethyl, aminocarbonyl, aminosulphonyl, $(C_{1-8})$alkylaminocarbonyl, $(C_{1-8})$alkylaminosulphonyl, di-$(C_{1-8})$alkylaminocarbonyl, di-$(C_{1-8})$alkylaminosulphonyl, phenylaminocarbonyl, sulphoguanidine, benzoylamino, phenylazo and phenoxycarbonyl group, in which the phenyl nuclei are unsubstituted or monosubstituted by a chlorine or bromine atom or by an $(C_{1-8})$alkyl, trifluoromethyl, cyano, nitro, aminocarbonyl or $(C_{1-8})$alkoxycarbonyl or $(C_{1-4})$alkylaminocarbonyl.

When $n$ is 2, a preferred tetrazo component radical is 4,4'-diphenylene substituted by 1 to 4 substituents selected from the group consisting of chlorine and bromine atoms, nitro, cyano, methyl or $(C_{1-8})$alkoxy groups. When $n$ is 2, the radicals $R_1$ may be the same or different, preferably the same.

In the compounds of formula I, as defined above, the preferred cycloalkyl radical is cyclohexyl. Preferred alkyl and alkoxy radicals are those containing 1, 2, 3 or 4 carbon atoms.

When $n$ is 1, preferably D is a phenyl radical having a total of up to three substituents selected from up to three chlorine and bromine atoms, up to two $(C_{1-4})$-alkoxycarbonyl, nitro, cyano or $(C_{1-4})$alkylsulphonyl groups and/or one aminocarbonyl, aminosulphonyl, $(C_{1-4})$alkylaminocarbonyl, $(C_{1-4})$alkylaminosulphonyl, di-$(C_{1-4})$alkylaminocarbonyl, di-$(C_{1-4})$alkylaminosulphonyl or phenylaminocarbonyl radical; an α- or β-(preferably α-)anthraquinonyl or benzimidazolonyl-5 radical.

When $\bar{n}$ is 2, preferably D is derived from a benzidine substituted one or twice by chlorine, bromine, nitro, cyano, methyl, methoxy or ethoxy.

Preferably $R_1$ is a phenylamino radical which is unsubstituted or substituted by a total of up to 3 substituents selected from up to two chlorine and bromine atoms, $(C_{1-4})$alkyl, $(C_{1-4})$alkoxy groups and/or one trifluoromethyl, sulphoguanidine, nitro or cyano group; a naphthylamino radical, an ethoxy radical or a methoxy radical, particularly the former two, and more particularly unsubstituted or substituted phenylamino.

A preferred group of compounds of formula I, are those of formula Ia,

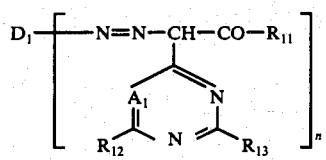

Ia in which
$R_{11}$ signifies an unsubstituted phenylamino, naphthylamino, methoxy or ethoxy radical or a phenylamino radical substituted by up to three substituents selected from the group consisting of chlorine, bromine, methyl and methoxy, (a maximum of 2 of each),
each of $R_{12}$ and $R_{13}$, which may be the same or different, signifies an amino, dimethylamino, diethylamino or, preferably, a hydroxy group,
$A_1$ signifies a group of the formula

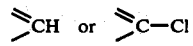

or, preferably, a nitrogen atom, and
either $n$ is 1 and $D_1$ signifies a phenyl radical substituted by up to two substituents selected from chlorine, bromine, methoxycarbonyl and ethoxycarbonyl; a benzimidazolonyl-5 or an α-anthraquinonyl radical,
or $n$ is 2 and $D_1$ signifies a radical of the formula

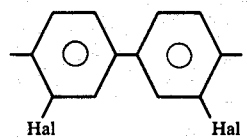

or

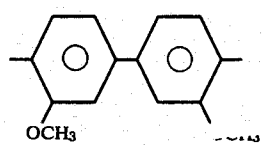

in which Hal signifies chlorine or bromine.
Of the compounds of formula Ia those where
$R_{11}$ signifies an unsubstituted phenylamino radical or a phenylamino radical substituted by up to 3 substituents selected from one chlorine atom and/or one or two methyl or methoxy groups,
each of $R_{12}$ and $R_{13}$, signifies a hydroxy group,
$A_1$ signifies a nitrogen atom,
$n$ is 1 and $D_1$ is an iso- or tere-phthalic acid dimethyl ester radical are preferred.

By the term "halogen" as used herein is meant chlorine, bromine or fluorine, unless otherwise stated.

The compounds of formula III may be produced by condensing a compound of formula IV, $$CH_3-CO-CH_2-CO-R_1 \qquad IV$$

in which $R_1$ is as defined above,
with a compound of formula V,

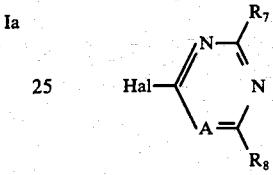

V in which
each of $R_7$ and $R_8$, which may be the same or different, signifies a fluorine, chlorine or bromine atom, or has one of the significances given for $R_2$ and $R_3$ above,
Hal signifies chlorine or bromine, and
A is as defined above,
in a 1:1 molar ratio, and if necessary, subsequently splitting off the $CH_3$—CO-group and/or exchanging any halogen atoms as $R_7$ and $R_8$ for an amino, alkoxy or hydroxy group.

The reaction of the compounds of formula IV with the compounds of formula V is preferably carried out in a weakly alkaline to strongly alkaline medium, for example, at a pH up to 12. The reaction temperature is suitably between 0° and 100° C. Suitable solvents are water, dioxane or acetone or mixtures of these solvents. An alkali metal carbonate or hydroxide may be used to bind the free hydrogen halide.

The splitting-off of the $CH_3$—CO-group is advantageously effected in a weakly alkaline or acid medium, for example at a pH of from 1 to 8, in a polar solvent such as water, acetone, dioxane, an alcohol, e.g. ethanol, isopropanol, or benzyl alcohol, glycols, e.g. ethylene glycol, propylene glycol, or diethylene glycol, an amide, e.g. dimethylformamide, dimethylacetamide; dimethyl sulphoxide and hexamethyl phosphorus triamide. The reaction temperature is between room temperature and the boiling temperature of the reaction mixture, preferably between 60° and 150° C. Thus, if the condensation reaction is carried out in a weakly alkaline medium, the $CH_3$—CO— can be split-off simultaneously with the condensation reaction.

Water or alkali metal hydroxides (sodium, potassium or lithium hydroxide), alkaline earth metal oxides or hydroxides (magnesium oxide, calcium oxide or calcium hydroxide) are suitable for the replacement of halogens as $R_7$ and/or $R_8$ by hydroxyl groups; alkali metal alcoholates (sodium or potassium alcoholate) are suitable for replacement by alkoxy groups.

Halogens may be replaced by amino groups by reaction with the corresponding amines, optionally in the presence of alkali metal carbonates, bicarbonates or hydroxides. The above-mentioned groups can be introduced simultaneously with the hydrolytic splitting-off of the group $CH_3CO—$.

The compounds of formula I, as defined above, are useful as pigments. They are suitable for dyeing synthetic substrates, including plastics or synthetic resins, in the mass, with or without the use of a solvent. They may be used in paints having an oil or aqueous base, in varnishes, in spin-dyeing or viscose or cellulose acetate, for pigmenting polyethylene, polystyrene, polyvinyl chloride, rubber or artificial leather. Furthermore, they are useful in printing inks, for the stock dyeing of paper, for coating textiles and for pigment printing.

The dyeings obtained have notable fastness to heat, light and weather; they are resistant to chemicals such as $SO_2$ and alkalis. They have notable fastness to migration, effluorescence, overvarnishing, flocculation, crystallization and solvents. They have a good depth of colour and good dispersibility and covering capacity.

The pigment properties may be further improved by subsequent treatment of the crude pigment in organic solvents at increased temperatures, e.g. 110° to 200° C. Suitable organic solvents (in which the pigments themselves are not dissolved) are chlorobenzenes (mixture), nitrobenzene, dimethylformamide, glacial acetic acid, ethylene glycol and quinoline.

Compounds of formula I in which $R_2$ and $R_3$ signify hydroxy are preferred pigments.

The compounds of formula I, where $R_2$ and $R_3$ have a significance other than hydroxy, are also useful as disperse dyes. They are useful for dyeing organic substrates of high molecular weight and hydrophobic character, for example substrates consisting of or comprising linear or aromatic polyesters, cellulose acetates or synthetic polyamides.

The dyeing methods employed are conventional methods, for example the methods described in French Pat. No. 1,443,371.

The dyeings obtained have notable fastness to light, sublimation, washing, solvents, rubbing, gas fumes, reduction and chlorine.

The following Examples serve to illustrate the invention further.

In the Examples all parts and percentages are by weight and all temperatures in degrees centigrade.

EXAMPLE 1

41.8 parts of aminoterephthalic acid dimethyl ester are dissolved in 100 parts of glacial acetic acid at 100° and are entered into a mixture of 400 parts of water and 65 parts of 35% hydrochloric acid. It is cooled to 0°, 14 parts of sodium nitrite are added with stirring, stirring is continued for about 5 minutes, 60 parts of urea are added to the solution and it is filtered.

56.1 parts of 2-chloro-(4',6'-dihydroxy-1',3',5'-triazinyl)-acetylaminobenzene are dissolved in 300 parts of dimethylformamide, a solution of 300 parts of anhydrous sodium acetate in 300 parts of water is added to the mixture, it is cooled to 0°, the diazonium salt solution is added with stirring over the course of about 10 minutes, it is stirred for 1 hour at 0° to 5° and for a further 12 hours at room temperature. Finally, the precipitate is filtered off, washed to neutral with water and dried.

In order to improve the fastness and applicatory properties, especially the rheological behaviour and the dispersibility, the pigment is subjected to treatment for 1 hour in dimethylformamide at about 150°.

The pure pigment so obtained of the formula

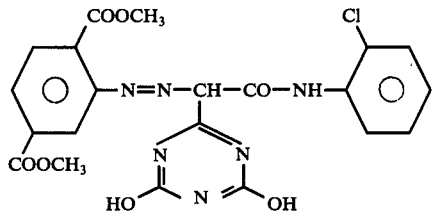

has a melting point of over 300° and dyes polyvinyl chloride in yellow shades with excellent fastness.

The elemental analysis is as follows:

|  | C | H | Cl | N | O |
|---|---|---|---|---|---|
| theory: | 50.4 | 3.4 | 7.1 | 16.8 | 22.4 |
| found: | 50.5 | 3.4 | 7.0 | 16.8 | 22.3 |

The above dye may also be produced as follows:

52.57 Parts of aminoterephthalic acid dimethyl ester are entered with stirring into a mixture of 25 parts of water and 25 parts of glacial acetic acid. It is stirred further for 1 hour, 62.5 parts of water and 73.1 parts of 35% hydrochloric acid are added and the mixture is stirred for 5 hours. The mixture is cooled in an ice bath and 75 parts of ice are added. A solution of 15.5 parts of sodium nitrite in 50 parts of water are subsequently introduced beneath the surface, at a temperature of 0°–5°, over the course of 30 minutes. After stirring for 1 further hour, 4 parts of 1N-amidosulphonic acid are added, the pH is adjusted to 3.4 with 30% sodium hydroxide solution and the mixture is stirred at 0°–5° for approximately 10 minutes. Impurities which may be present are filtered off.

70.15 Parts of 2-chloro-(4',6'-dihydroxy-1',3',5'-triazinyl)-acetylaminobenzene are dissolved in a mixture of 6,25 parts of water and 62.5 parts of 30% sodium hydroxide solution. Glacial acetic acid is added to the solution until the pH is 6.9. The resulting suspension which is heated to 40° is combined with stirring over the course of 2 hours with the diazonium salt solution and the mixture is stirred at 40° for 1 hour. Subsequently, it is heated to 80° and stirred for 1 further hour. The pigment is filtered off, washed with approximately 7000 parts of hot water and dried at 70° in a vacuum.

In order to improve the dyeing properties the pigment is subjected to treatment for 1 hour in boiling ethanol.

2-chloro-(4',6'-dihydroxy-1',3',5'-triazinyl)acetylaminobenzene may be produced as follows:

A solution of 396 parts of cyanurochloride in 1000 parts of dioxane is entered slowly with stirring into 1000 parts of ice-water mixture. To the resultant mixture is added a mixture of 247 parts of 2-chloroacetoacetylaminobenzene, 920 parts of water and 80 parts of sodium hydroxide, this being very slowly (over the course of about 40 minutes) at a temperature of 0° to 5°. The mixture is stirred for a further 30 minutes at the above temperature and is filtered. The precipitate is washed with ice-cold water, it is then entered into 5000 parts of ethanol and heated at reflux, with stirring, for 20 hours. After cooling to 20°, the precipitate is filtered, washed several times with hot water and vacuum dried at 100°.

The product thus obtained corresponds to the formula

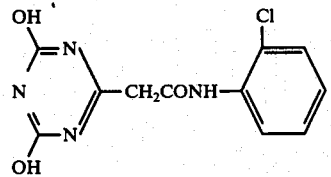

which is demonstrated by the elemental analysis

|  | C | H | Cl | N | O |
|---|---|---|---|---|---|
| theory: | 47.1 | 3.2 | 12.6 | 20.0 | 17.1 |
| found: | 47.0 | 3.4 | 12.8 | 20.2 | 17.3 |

In the following Table 1 further pigments are given which may be produced in analogy with the procedures set forth above; they are of the general formula

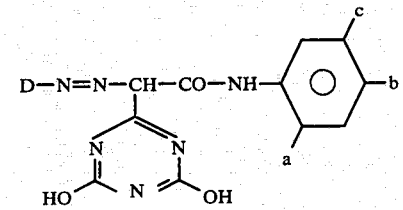

Table 1

| Example No. | D | a | b | c | Shade in PVC |
|---|---|---|---|---|---|
| 2 | H₃COOC—⌬—COOCH₃ (4-methyl) | —OCH₃ | Cl | —OCH₃ | yellow |
| 3 | " | " | H | " | " |
| 4 | " | H | Cl | H | " |
| 5 | " | —OCH₃ | H | H | " |
| 6 | " | H | H | H | " |
| 7 | " | —CH₃ | H | H | " |
| 8 | " | H | H | H | " |
| 9 | Cl—⌬—COOCH₃ (4-methyl) | H | Cl | H | " |
| 10 | " | Cl | H | H | " |
| 11 | " | —OCH₃ | Cl | —OCH₃ | " |
| 12 | " | " | H | H | " |
| 13 | " | " | H | —OCH₃ | " |
| 14 | " | —CH₃ | H | H | " |
| 15 | " | —Cl | H | H | " |
| 16 | anthraquinonyl | —OCH₃ | Cl | —OCH₃ | orange |
| 17 | " | H | Cl | H | yellow |
| 18 | " | Cl | H | H | " |
| 19 | benzimidazolonyl | —OCH₃ | Cl | —OCH₃ | orange |
| 20 | " | " | H | " | " |
| 21 | H₃COOC—⌬—COOCH₃ (3,5-) | H | H | H | yellow |
| 22 | " | H | Cl | H | " |
| 23 | " | Cl | H | H | " |
| 24 | " | —OCH₃ | Cl | —OCH₃ | orange |
| 25 | " | " | H | H | yellow |
| 26 | " | " | H | —OCH₃ | orange |
| 27 | " | —CH₃ | H | H | yellow |
| 28 | H₅C₂OOC—⌬—COOC₂H₅ | " | H | H | " |

Table 1-continued

| Example No. | D | a | b | c | Shade in PVC |
|---|---|---|---|---|---|
| 29 | 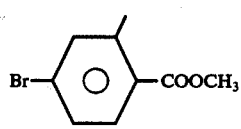 Br—⬡—COOCH₃ (with CH₃) | H | H | H | " |
| 30 | 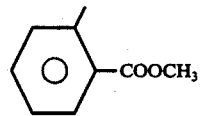 ⬡—COOCH₃ (with CH₃) | H | —CH₃ | H | " |

In Table 2 dyes are given which may be produced in analogy with the procedure as set out above; they are of the general formula

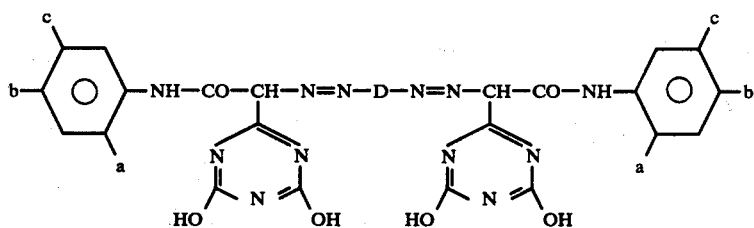

Table 2

| Example No. | D | a | b | c | Shade in PVC |
|---|---|---|---|---|---|
| 31 | 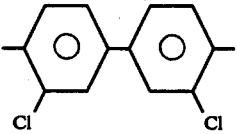 biphenyl with Cl, Cl | Cl | H | H | orange |
| 32 | " | —OCH₃ | H | H | " |
| 33 | " | " | Cl | —OCH₃ | " |
| 34 | " | " | H | " | " |
| 35 | " | —CH₃ | H | H | " |
| 36 | " | H | H | H | " |
| 37 | " | H | Cl | H | " |
| 38 | " | —OCH₃ | Cl | —OCH₃ | " |
|  | 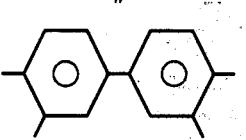 biphenyl with Br, Br |  |  |  |  |
| 39 | 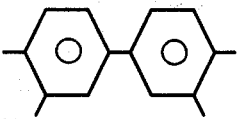 biphenyl with OCH₃, OCH₃ | Cl | H | H | red |
| 40 | " | —OCH₃ | H | H | orange |
| 41 | " | " | Cl | —OCH₃ | red |
| 42 | " | " | H | " | " |
| 43 | " | —CH₃ | H | H | orange |
| 44 | " | H | H | H | " |
| 45 | " | H | Cl | H | red |
| 46 | " | H | Br | H | " |

Further dyes are shown in Table 3. They may be produced in analogy with the procedures as set forth in Example 1 and correspond to the general formula

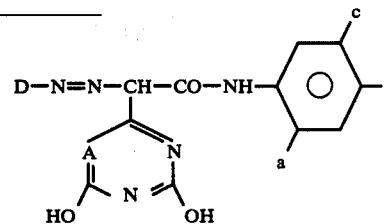

Table 3

| Example No. | D | A | a | b | c | Shade in PVC |
|---|---|---|---|---|---|---|
| 47 | H₃COOC—⟨⬡-CH₃⟩—COOCH₃ | ⟩C—Cl (CH₃) | H | H | H | yellow |
| 48 | " | " | —CH₃ | H | H | " |
| 49 | " | " | —OCH₃ | H | H | " |
| 50 | " | " | Cl | H | H | " |
| 51 | " | ⟩C—H (CH₃) | Cl | H | H | " |
| 52 | Cl—⟨⬡-CH₃⟩—COOCH₃ | " | Cl | H | H | " |

The dyes of the following formulae are produced in a manner analogous to that of the first operating process of Example 1:

Example 53

COOCH₃-substituted phenyl—N=N—CH—CO—NH—naphthyl, with triazine ring bearing HO, OH Shade in PVC: orange

Example 54 naphthyl—NH—CO—CH—N=N—⟨phenyl-OCH₃⟩—⟨phenyl-OCH₃⟩—N=N—CH—CO—NH—naphthyl, with triazine rings bearing HO, OH Shade in PVC: red

Example 55

(COOCH₃)₂-phenyl—N=N—CH—CO—OC₂H₅, with triazine ring bearing HO, OH

Shade in PVC: yellow

Example 56

Disperse dye, sample dyeing in a fabric of polyester fibre yellow

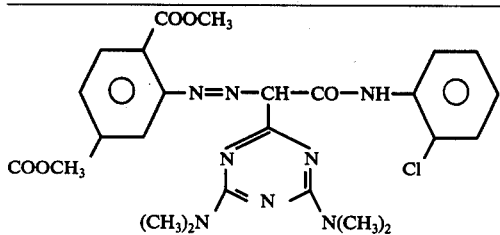

Example 57

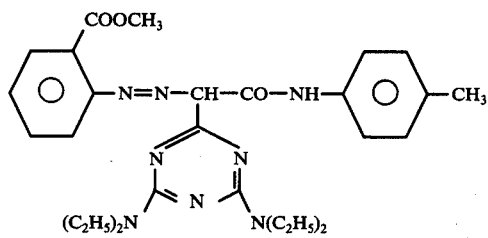

oil-soluble dye yellow

APPLICATION EXAMPLE A

To a basic mixture consisting of
63 parts of polyvinyl chloride emulsion,
32 parts of dioctyl phthalate,
3 parts of commercial epoxy softener,
1.5 parts of stabilizer (barium-cadmium-stearate mixture, also commercial) and
0.5 parts of a chelator (commercial)
are added 0.5 parts of the pigment of Example 1 and 5 parts of titanium dioxide pigment, and they are mixed together intimately.

The mixture is rolled for 8 minutes in a roll mixer heated to 160° C and having friction rollers (one roller at 20, the other at 25 revolutions per minute) so as to obtain better pigment distribution, the sheet obtained, of 0.3 mm thickness and having a yellow shade, is removed.

The dyeing is very fast to light and migration, and is heat-resistant.

APPLICATION EXAMPLE B

A mixture of 7 parts of the dye produced in accordance with Example 56, 4 parts of sodium dinaphthyl methane disulphonate, 4 parts of sodium cetyl sulphate and 5 parts of anhydrous sodium sulphate is ground in a ball mill over the course of 48 hours to give a fine powder.

1 Part of the obtained dyeing preparation is pasted with a small amount of water and the resulting suspension is added through a sieve to a bath of 4000 parts of water containing 3 parts of sodium lauryl sulphate. The liquor ratio is 1:40. 100 Parts of a purified fabric of polyester fibre are entered into the dyebath at 40°-50° which is then set with an emulsion of 20 parts of a chlorinated benzene in water. The bath is slowly heated to 100° and the fabric dyed at 95°-100° for 1 to 2 hours. The fabric dyed in a yellow shade is washed, soaped, washed again and dried. The level dyeing has notable fastness to light, cross dyeing, washing, water, sea water, perspiration, sublimation, gas fumes, thermofixation, pleating and permanent press finishing.

What is claimed is:

1. A compounds of the formula

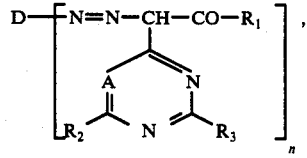

wherein

D is phenyl, substituted phenyl, naphthyl, substituted naphthyl, quinolyl, substituted quinolyl, benzimidazolonyl, substituted benzimidazolonyl, quinoxalyl, substituted quinoxalyl, anthraquinonyl or substituted anthraquinonyl when $n$ is 1, wherein any substituted phenyl, substituted naphthyl, substituted quinolyl, substituted benzimidazolonyl, substituted quinoxalyl or substituted anthraquinonyl has 1 to 3 substituents each of which is independently fluoro, chloro, bromo, $C_{1-8}$alkyl, $C_{1-8}$alkoxy, cyano, nitro, ($C_{1-8}$alkoxy)carbonyl, $C_{1-8}$alkylsulfonyl, trifluoromethyl, carbamoyl, sulfamoyl, ($C_{1-8}$alkyl)carbamoyl, $C_{1-8}$alkylsulfamoyl, di-($C_{1-8}$alkyl)carbamoyl, di-($C_{1-8}$alkyl)sulfamoyl, phenylcarbamoyl, (monosubstituted phenyl)carbamoyl, guanidinosulfonyl, benzamido, (monosubstituted phenyl)carbonylamino, phenylazo, monosubstituted phenylazo, phenoxycarbonyl or monosubstituted phenoxycarbonyl, wherein the substitutent of any (monosubstituted phenyl)carbomoyl, (monosubstituted phenyl)carbonylamino, monosubstituted phenylazo or monosubstituted phenoxycarbonyl is chloro, bromo, $C_{1-8}$alkyl, trifluoromethyl, cyano, nitro, carbamoyl, ($C_{1-8}$-alkoxy)carbonyl or ($C_{1-4}$alkyl)carbamoyl, with the proviso that the maximum number of each substituent selected from the group consisting of cyano, nitro, ($C_{1-8}$alkoxy)carbonyl and $C_{1-8}$-alkylsulphonyl is two and the maximum number of each substituent selected from the group consisting of trifluoromethyl, carbamoyl, sulfamoyl, ($C_{1-8}$alkyl)carbamoyl, $C_{1-8}$alkylsulfamoyl, di-($C_{1-8}$alkyl)carbamoyl, di-($C_{1-8}$alkyl)sulfamoyl, phenylcarbamoyl, (monosubstituted phenyl)carbamoyl, guanidinosulfonyl, benzamido, (monosubstituted phenyl)carbonylamino, phenylazo, monosubstituted phenylazo, phenoxycarbonyl and monosubstituted phenoxycarbonyl is one, or D is 4,4'-diphenylene substituted by 1-4 substituents each of which is independently chloro, bromo, nitro, cyano, methyl or $C_{1-8}$alkoxy when $n$ is 2, $R_1$ is $-NH_2$, $-NHR_4$ or $-OR_4$, wherein $R_4$ is $C_{1-8}$alkyl, $C_{5-8}$-cycloalkyl, phenyl, substituted phenyl, naphthyl, substituted naphthyl, phthalimidyl, substituted phthalimidyl, phthalizinyl, substituted phthalizinyl, quinazolonyl, substituted quinazolonyl, quinoxalinyl, substituted quinoxalinyl, quinoxaline-2,3substituted quinoxaline-2,3-dion-yl, benzimidazolonyl, substituted benzimidazolonyl, pyridyl, substituted pyridyl, thienyl, substituted thienyl, 2-thiazolyl or substituted 2-thiazolyl, wherein any substituted phenyl, substituted naphthyl, substituted phthalimidyl, substituted phthalizinyl, substituted quinaolonyl, substituted quinoxalinyl, substituted quinoxaline-2,3-dion-yl, substituted benzimidazolonyl, substituted pyridyl, substituted thienyl or substituted 2-thiazolyl has 1-3 substituents each of which is independently chloro, bromo, $C_{1-8}$alkyl, $C_{1-8}$alkoxy, trifluoromethyl, guanidinosulfonyl, nitro, cyano, $-CO-NH-R_5$ or $-SO_2-NH-R_5$, with the proviso that the maximum number of each substituent selected from the group consisting of chloro, bromo, $C_{1-8}$alkyl and $C_{1-8}$alkoxy is two and the maximum number of each substituent selected from the group consisting of trifluoromethyl, guanidinosulfonyl, nitro, cyano, $-CO-NH-R_5$ and $-SO_2NH-R_5$ is one, wherein $R_5$ is $C_{1-8}$alkyl, $C_{5-8}$cycloalkyl, phenyl, substituted phenyl, naphthyl or substituted naphthyl, wherein any substituted phenyl or substituted naphthyl has 1-3 substituents each of which is independently halo, $C_{1-8}$-alkyl, $C_{1-8}$alkoxy, trifluoromethyl, nitro, cyano, phenylcarbamoyl or phenylsulfamoyl, with the proviso that the maximum number of each substituent selected from the group consisting of halo, $C_{1-8}$alkyl and $C_{1-8}$alkoxy is two and the maximum number of each substituent selected from the group consisting of trifluoromethyl, nitro, cyano, phenylcarbamoyl, and phenylsulfamoyl is one, each of $R_2$ and $R_3$ is independently hydrogen, hydroxy, $C_{1-8}$alkoxy, amino, $C_{5-8}$cycloalkylamino, $C_{1-8}$alkylamino, di-($C_{1-8}$alkyl)amino, phenylamino, naphthylamino or N-phenyl-N-$C_{1-8}$alkylamino, A is N or $R_6-C$, wherein $R_6$ is hydrogen, halo or $C_{1-8}$-alkyl, and $n$ is 1 or 2, wherein each halo is independently fluoro, chloro or bromo.

2. A compound according to claim 1 wherein each of $R_2$ and $R_3$ is hydroxy.

3. A compound according to claim 1 wherein each of $R_2$ and $R_3$ is independently hydrogen, $C_{1-8}$alkoxy, amino, $C_{5-8}$cycloalkylamino, $C_{1-8}$alkylamino, di-($C_{1-8}$alkyl)amino, phenylamino, naphthylamino or N-phenyl-N-$C_{1-8}$alkylamino.

4. A compound according to claim 1 wherein $n$ is 1.

5. A compound according to claim 1 wherein $n$ is 2.

6. A compound according to claim 1 wherein each alkyl, alkoxy, alkyl moiety and alkoxy moiety independently has 1-4 carbon atoms, and each cycloalkyl and cycloalkyl moiety is cyclohexyl.

7. A compound according to claim 6 wherein D is substituted phenyl having 1-3 substituents each of which is independently chloro, bromo, ($C_{1-4}$alkoxy)carbonyl, nitro, cyano, $C_{1-4}$alkylsulfonyl, carbamoyl, sulfamoyl, ($C_{1-4}$alkyl)carbamoyl, $C_{1-4}$alkylsulfamoyl, di-($C_{1-4}$alkyl)carbamoyl, di-($C_{1-4}$alkyl)sulfamoyl or phenylcarbamoyl, with the proviso that the maximum number of each substituent selected from the group consisting of ($C_{1-4}$alkoxy)carbonyl, nitro, cyano and $C_{1-4}$alkylsulfonyl is two and the maximum number of each substituent selected from the group consisting of carbamoyl, sulfamoyl, $C_{1-4}$alkylcarbamoyl, $C_{1-4}$alkylsulfamoyl, di-($C_{1-4}$alkyl)carbamoyl, di-($C_{1-4}$alkyl)sulfamoyl and phenylcarbamoyl is one; α-anthraquinonyl; β-anthraquinonyl or benzimidazolonyl when $n$ is 1 and D is 4,4'-diphenylene having 1 or 2 substituents each of which is independently chloro, bromo, nitro, cyano, methyl, methoxy or ethoxy when $n$ is 2.

8. A compound according to claim 7 wherein each of $R_2$ and $R_3$ is hydroxy.

9. A compound according to claim 7 wherein each of $R_2$ and $R_3$ is independently hydrogen, $C_{1-4}$alkoxy, amino, cyclohexylamino, $C_{1-4}$alkylamino, di($C_{1-4}$alkyl)amino, phenylamino, naphthylamino or N-phenyl-N-$C_{1-4}$alkylamino.

10. A compound according to claim 7 wherein $n$ is 1.

11. A compound according to claim 7 wherein $n$ is 2.

12. A compound according to claim 7 wherein $R_1$ is phenylamino; naphthylamino or (substituted phenyl)amino having 1-3 substituents each of which is independently chloro, bromo, $C_{1-4}$alkyl, $C_{1-4}$alkoxy, trifluoromethyl, guanidinosulfonyl, nitro or cyano, with the proviso that the maximum number of each substituent selected from the group consisting of chloro, bromo, $C_{1-4}$alkyl and $C_{1-4}$-alkoxy is two and the maximum number of each substituent selected from the group consisting of trifluoromethyl, guanidinosulfonyl, nitro and cyano is one.

13. A compound according to claim 12 wherein each of $R_2$ and $R_3$ is hydroxy.

14. A compound according to claim 12 wherein each of $R_2$ and $R_3$ is independently hydrogen, $C_{1-4}$alkoxy, amino, cyclohexylamino, $C_{1-4}$alkylamino, di($C_{1-4}$alkyl)amino, phenylamino, naphthylamino or N-phenyl-N-$C_{1-4}$alkylamino.

15. A compound according to claim 7 having the formula

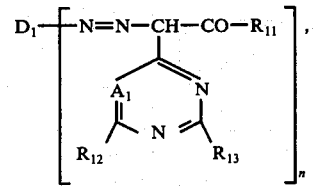

wherein $R_{11}$ is phenylamino; naphthylamino; methoxy; ethoxy or (substituted phenyl)amino having 1-3 substituents each of which is independently chloro, bromo, methyl or methoxy, with the proviso that the maximum number of each substituent is two, each of $R_{12}$ and $R_{13}$ is independently amino, dimethylamino, diethylamino or hydroxy, $A_1$ is N, H—C or Cl—C, $n$ is 1 or 2, and $D_1$ is substituted phenyl having 1 or 2 substituents each of which is independently chloro, bromo, methoxycarbonyl or ethoxycarbonyl; benzimidazolonyl-5 or α-anthraquinonyl when $n$ is 1 and $D_1$ is 4,4'-(3,3'-dimethoxydiphenylene) or 4,4'-(3,3'-dihalodiphenylene), wherein each halo is chloro or bromo when $n$ is 2.

16. A compound according to claim 15 wherein $n$ is 1.
17. A compound according to claim 15 wherein $n$ is 2.
18. A compound according to claim 15 wherein each of $R_{12}$ and $R_{13}$ is hydroxy.
19. A compound according to claim 18 wherein
   $R_{11}$ is phenylamino or (substituted phenyl)amino having 1-3 substituents each of which is independently chloro, methyl or methoxy, with the proviso that the maximum number of chloro substituents is one and the maximum number of methyl and methoxy substituents is two,
   each of $R_{12}$ and $R_{13}$ is hydroxy,
   $A_1$ is N, and
   $n$ is 1.
20. A compound according to claim 19 wherein $D_1$ is dimethoxycarbonylphenyl, with the proviso that the methoxycarbonyl groups are meta or para or each other.
21. The compound according to claim 18 having the formula

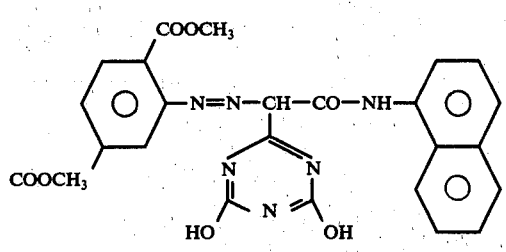

22. The compound according to claim 19 having the formula

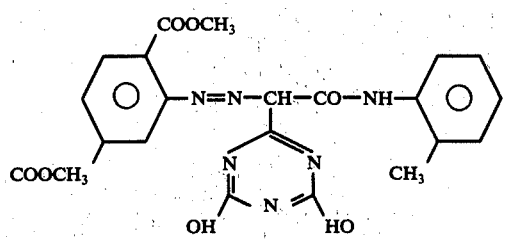

23. The compound according to claim 19 having the formula

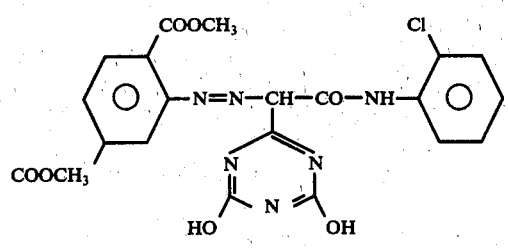

24. The compound according to claim 19 having the formula

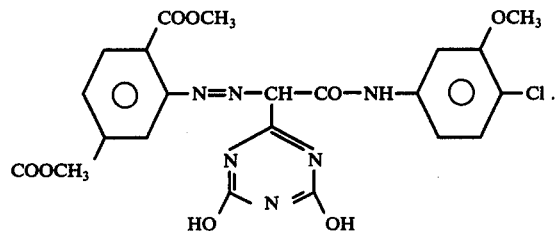

25. The compound according to claim 19 having the formula

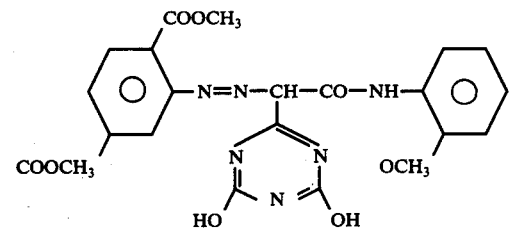

26. The compound according to claim 19 having the formula

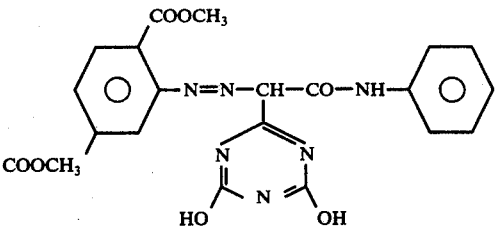

27. The compound according to claim 19 having the formula

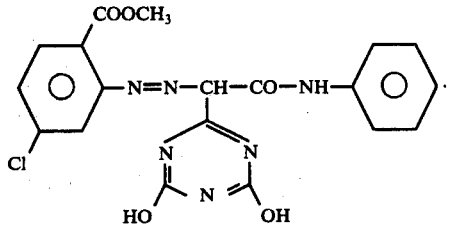

28. The compound according to claim 19 having the formula

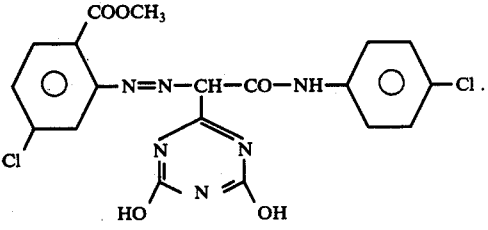

29. The compound according to claim 19 having the formula

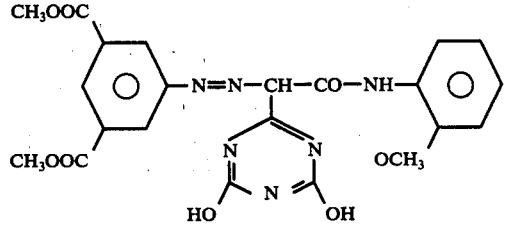

* * * * *